United States Patent
Wright et al.

(10) Patent No.: US 8,229,078 B2
(45) Date of Patent: Jul. 24, 2012

(54) BACKGROUND NOISE EFFECTS

(75) Inventors: Joshua Scott Wright, Chamblee, GA (US); Paul Humphries, Atlanta, GA (US); Jeffrey C. Mikan, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1134 days.

(21) Appl. No.: 11/737,273

(22) Filed: Apr. 19, 2007

(65) Prior Publication Data

US 2008/0260112 A1 Oct. 23, 2008

(51) Int. Cl.
*H04M 1/64* (2006.01)

(52) U.S. Cl. .... 379/68; 379/355; 379/88.01; 379/88.16; 379/201.01; 704/208

(58) Field of Classification Search ............... 379/88.01, 379/67.1, 201.01, 355, 88.16; 704/208
See application file for complete search history.

(56) References Cited

U.S. PATENT DOCUMENTS

| | | | | |
|---|---|---|---|---|
| 6,125,175 | A * | 9/2000 | Goldberg et al. | 379/201.01 |
| 6,683,938 | B1 * | 1/2004 | Henderson | 379/67.1 |
| 7,003,083 | B2 * | 2/2006 | Kovales et al. | 379/88.16 |
| 7,209,475 | B1 * | 4/2007 | Shaffer et al. | 370/355 |
| 2003/0101048 | A1 * | 5/2003 | Liu | 704/208 |
| 2008/0056455 | A1 * | 3/2008 | Yang et al. | 379/88.01 |

FOREIGN PATENT DOCUMENTS

| | | |
|---|---|---|
| EP | 1139337 A1 | 10/2001 |
| WO | WO 2008/130639 | 10/2008 |

* cited by examiner

*Primary Examiner* — Fan Tsang
*Assistant Examiner* — Van D Huynh
(74) *Attorney, Agent, or Firm* — Woodcock Washburn LLP

(57) ABSTRACT

Mechanisms are disclosed that allow for the use of a false background, or background tone, in voice input in a telephonic call. A voice input may have both voice from a user talking and a background noise input which may be every other noise received at the user's phone. A trigger to use a background tone is received, the background tone is selected and the associated background tone file is retrieved. Then, a combiner combines the voice input with the background tone file. A filter may be used to filter the actual background noise from the voice input. Additionally, background tones may be used in various telephonic networks, including traditional land-line and wireless cellular networks.

22 Claims, 6 Drawing Sheets

BACKGROUND NOISE EFFECTS

FIELD OF THE INVENTION

The present disclosure relates generally to the field of telecommunications, and more particularly, the use of background tones.

BACKGROUND OF THE INVENTION

In a typical telephone call, the voice transmitted from a sending phone to a receiving phone through a network may have both a voice component and a background noise component. The voice component may be considered to be the sound waves of the user's voice whereas the background noise component may be considered to be essentially all other transmitted sound waves. A receiving party may hear the background noise if the background noise is not filtered either at the handset or somewhere else along the voice path before it is heard by the receiving party. For purposes of this application, the term "transmitting party" shall mean the party whose telephone is transmitting background noise and the "receiving party" shall be the party whose telephone is receiving or hearing the background noise.

Although background noise may be viewed as an inconvenience, because it is transmitted contemporaneously on the voice channel, background noise may also be a source of information for the receiving party of the background noise. For example, someone on a telephone call with another person believed to be in an office will typically not expect to hear loud construction sounds. Often, without conscience effort, a receiving party may use background noise, if available, to confirm the location or other status of the transmitting party. Continuing with the present example, if the receiving party heard construction noises, the receiving party may want to inquire whether or not the transmitting party is actually at the office. Thus, background noise may be used by the recipient as an additional source of information.

SUMMARY OF THE INVENTION

Mechanisms are provided that combines a false background noise, or background tone, with a voice transmitted along a voice path. In one exemplary and non-limiting aspect, a method for implementing a background tone in a telephonic call is provided, comprising receiving a trigger to indicate a background tone is desired, selecting a desired background tone, retrieving the selected background tone file associated with the selected background tone, and combining the selected background tone file with a voice channel to be transmitted.

In another exemplary and non-limiting aspect, a system for a user of a phone to use a background tone in a telephonic call is provided comprising a memory for storing a plurality of background tone files, a trigger input for triggering the use of a background tone, a background tone selection input for selecting a background tone, a background tone output in communication with the background tone selection input and the memory, wherein the background tone output outputs the selected background tone, a combiner for combining the selected background tone file with a voice channel, and a telephonic switch having a voice channel input for receiving a voice channel, wherein the telephone switch sends a received voice channel to the combiner.

In another exemplary and non-limiting aspect, an apparatus for a user of a telephone to use a background tone in a telephonic call comprises a mobile switching center, wherein the mobile switching center receives an input to use a selected background tone, wherein the mobile switching center further comprises a voice channel input for receiving a voice channel, a media gateway in communication with the mobile switching center, wherein the mobile switching center sends a signal to the media gateway to retrieve the selected background tone, a media application server in communication with the media gateway, wherein the media application server further comprises a memory for storing background tone files, wherein the media application server sends the selected background tone file to the media gateway, and a combiner for combining a background tone file with a voice channel, wherein the combiner comprises an input for receiving the received voice channel and an input for receiving the background tone.

In yet another exemplary and non-limiting aspect, a method for a first user to use a background tone comprises initiating the use of background tones, retrieving a list of a plurality of available background tones, selecting from the plurality of available background tones at least one background tone, retrieving a background tone file associated with the selected background tone, and combining the retrieved background tone file with the voice channel associated with the first user.

In still another exemplary and non-limiting aspect, a cell phone capable of using background tones comprises a background tone use trigger, a display for displaying a list of available background tones, a memory for storing a plurality of background tone files associated with the available background tones, a selection input for selecting a background tone, and a combiner for combining the selected background tone file with a voice channel.

It should be noted, that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION OF ILLUSTRATIVE EMBODIMENTS

The subject matter of the described embodiments is described with specificity to meet statutory requirements.

However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described. It should be understood that the explanations illustrating data or signal flows are only exemplary. For example, voice and a background tone file may be combined using various processes. The following description is illustrative and non-limiting to any one aspect.

Figure 1:
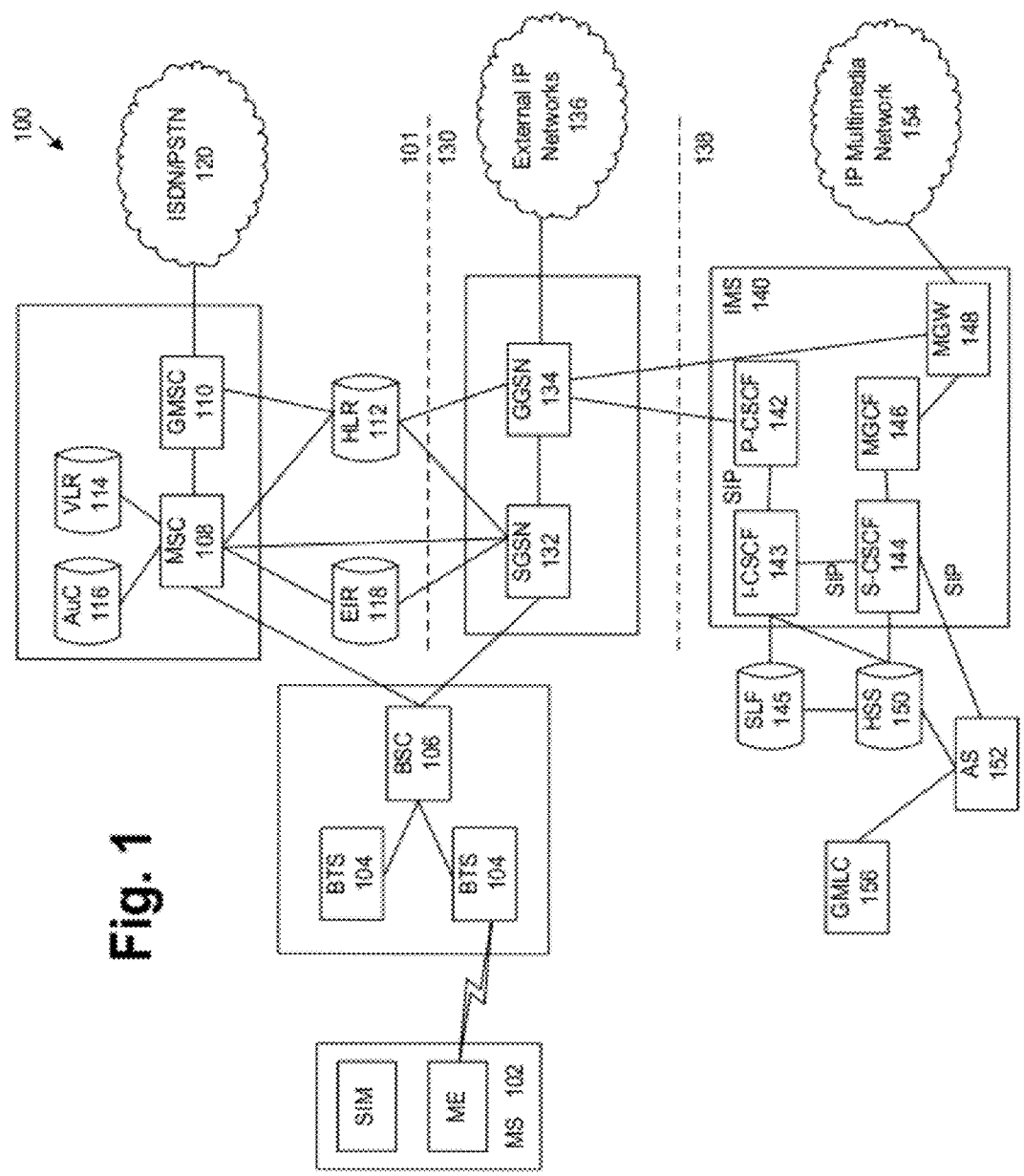
FIG. 1 illustrates an exemplary GSM/GPRS/IP multimedia network architecture.

FIG. 1 shows a GSM/GPRS/IP multimedia network architecture 100 that includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132 and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls. The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, arc the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). Network operation modes of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Figure 2:
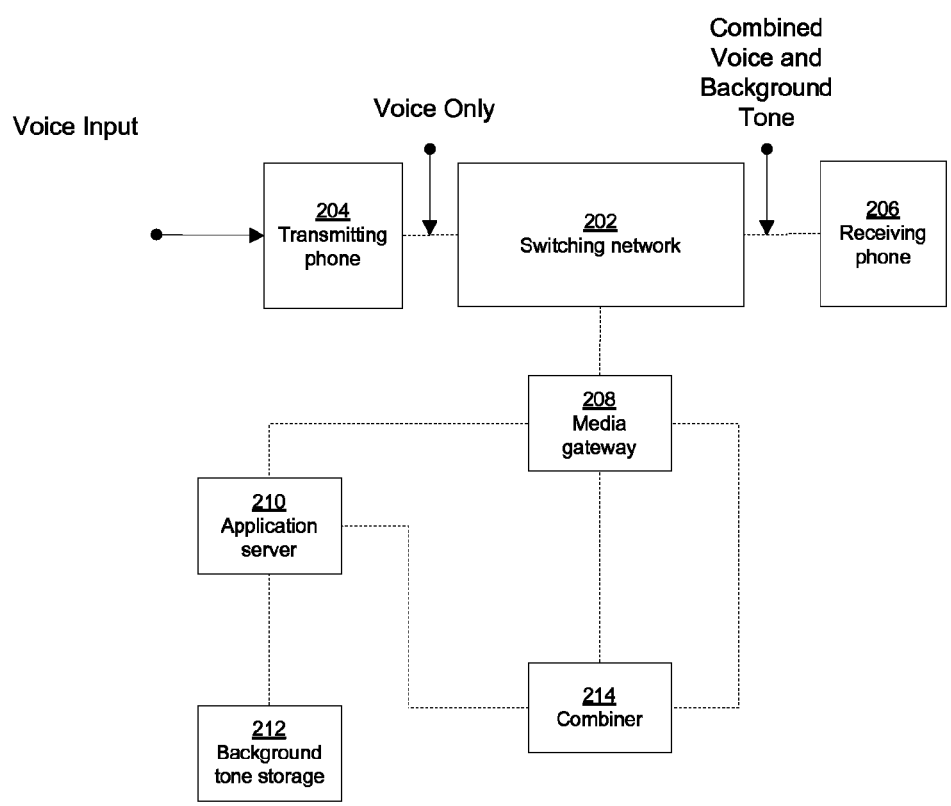
FIG. 2 is a diagram illustrating a network capable of adding a background tone to a voice channel.

FIG. 2 is a diagram illustrating a network capable combining a voice input or channel with a background tone. A background tone may be any type of input that is used in lieu of the actual background from a caller. For example, a background tone may be a different background noise than what exists currently around the caller to hide or mask the actual background noise. Another example may be entertainment based, such as music. Another example may be a tone that reflects a personalized setting, such as a flowing river to give a calming noise. Another example may be a tone used to authenticate the user by requiring the user to use a certain background tone to start or continue a secure transmission.

A still further example may be to send advertisement messages to the recipient. Further, the background tone may be combined with the voice input, which may also include the actual background noise, or be combined with a voice input after the actual background, or ambient, noise is removed by one or more noise filters. Additionally, more than one background tone may be used on a single call. For example, the transmitting phone may use one background tone while the receiving phone may use a different background tone. In another example, one of the phones may use multiple background tones in a single call, either combined together with the voice or alternating between background tones.

Transmitting phone 204 transmits a voice to switching network 202 which in turn transmits the voice to receiving phone 206. Transmitting phone 204 and receiving phone 106 may be any type of telephone, including a traditional land line or wireless cellular phone. The present disclosure is not limited to any type of telephone. Further, transmitting phone 204 may be receiving phone 206 when receiving a signal. Transmitting phone 204 and receiving phone 206 are indicated in a transmitter/recipient format only to simplify this description. Additionally, switching network 202 may take various forms depending upon the connection made between transmitting phone 204 and receiving phone 206. The present disclosure is not limited to any type of switching network.

The use of background tones may be initiated automatically or manually through the use of a trigger. A trigger may be generated when a key is pressed on transmitting phone 204, or by a condition. In one exemplary and non-limiting aspect, the transmitting party, either before or during a telephone call, may wish to use background tones. Transmitting phone 204 may be configured to have a key designated that when depressed, initiates the use of background tones in a manner described more fully below. In another exemplary and non-limiting aspect, a profile may be associated with the transmitting party. The profile may have a number of conditions, which if met, automatically generate a signal and initiate the use of background tones. For example, the transmitting party may wish that during the day, a musical background tone be used, but in the evening hours, no background tones be used. Thus, in this example, the condition that causes the generation of the trigger is the time. The profile and other conditions, as well as other means for causing a trigger to be generated, may be stored locally on the telephone or remotely, such as in the home location register (HLR).

Also shown in FIG. 2 is media gateway 208. Media gateway 208 provides background tones to switching network 202. In one exemplary and non-limiting example, once the use of background tones has been triggered, switching network 202 may prompt media gateway 208 to provide a selected background tone. In one exemplary and non-limiting example, media gateway 208 may monitor switching network 202 and prompt switching network 202 that background tones are to be used. The background tone may be selected according to various criteria. For example, the user of transmitting phone 204 may prompt the use of background tones and which background tone to use through the use of a softkey on transmitting phone 204. Additionally, the background tone may be selected depending upon system configuration or the session initial protocol (SIP). In one exemplary and non-limiting example, a certain background tone may be used at a time of the day when the user is expected to be at work.

Once the use of background tones have been triggered, media gateway 208 sends a background tone request to application server 210. Application server 210 retrieves from background tone storage 212 the background tone requested by application server 210. Background tone server 212 sends the background tone to application server 210. Upon receiving the background tone, application server 210 prompts media gateway 208 that it has received the background tone. Media gateway server 208 then prompts switching network 202 that application server 210 has received the background tone and requests receipt of voice from switching network 202. Switching network 202 then sends the voice input to media gateway 208, which in turn sends the voice input to combiner 214.

Combiner 214 preferably is used to combine the background tone at application server 210 with the voice input from media gateway 208. The background tone is preferably a sound file of sufficient length or can be looped to provide enough sound time to provide an effective background tone for the duration of the call. The present disclosure is not limited to any type of sound file. Further, in one exemplary and non-limiting example, application server 210 may send the background tone file to media gateway 208. In one exemplary and non-limiting example, combiner 214 may be an integral process of media gateway 208.

The combined signal from combiner 214 is sent to media gateway 208, which in turn sends the combined signal to switching network 202 from transmission to receiving phone 206. In one exemplary and non-limiting example, combiner 214 may be an integral process of switching network 102 or interface directly with switching network 202. In this example, once media gateway 208 receives the background tone from application server 210, media gateway 208 will send the background tone to switching network 202. Switching network 202 will then initiate combiner 214 to combine the voice received from sending phone 204 with the received background tone file from media gateway 208. Finally, switching network 202 preferably transmits the combined signal to receiving phone 206.

In one exemplary and non-limiting example, the background tone may be changed or stopped during the call. Further, in one exemplary and non-limiting example, filters may be used to filter the actual background noise transmitted by sending phone 204. A filter may reduce the bandwidth used to transmit the combined signal to receiving phone 206. Additionally, the use of a filter may increase the clarity or quality of the phone call by removing undesired noise while providing an essentially "clean" voice component to combine with the background tone file.

Figure 3:
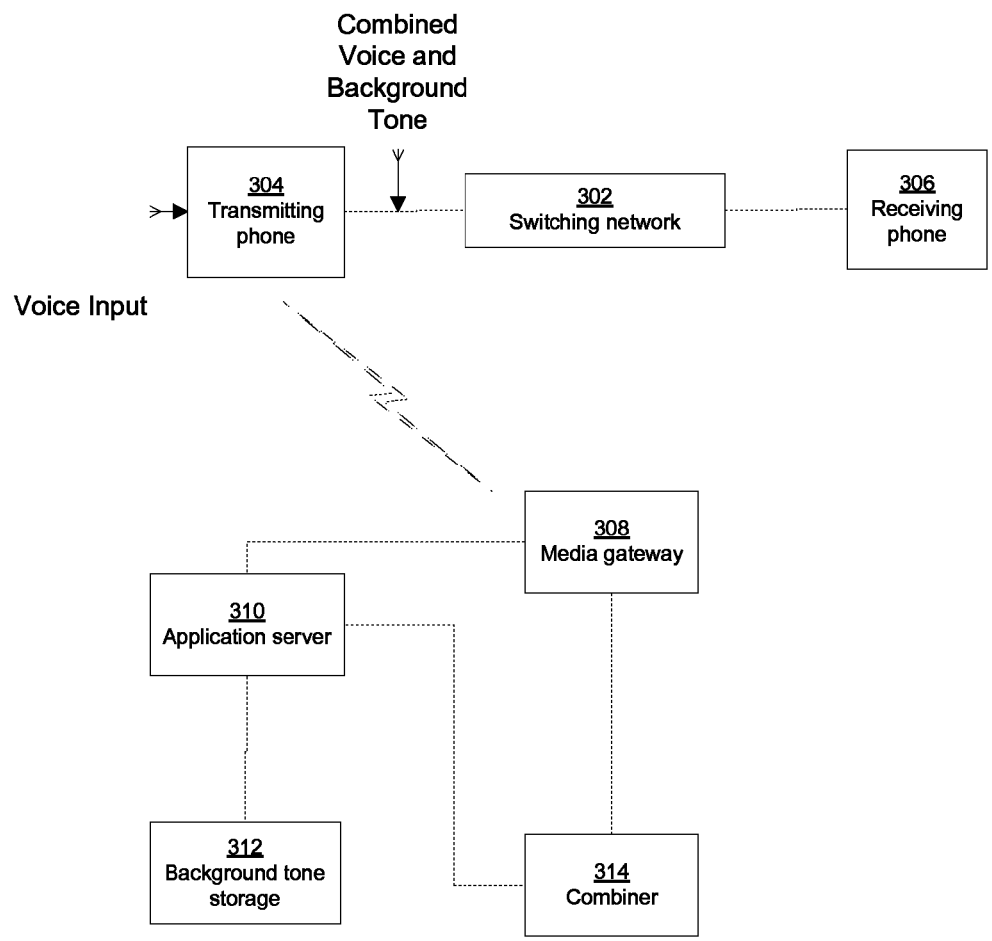
FIG. 3 is a diagram illustrating a phone capable of combining the voice received at the transducer of the phone with a background tone.

FIG. 3 is a diagram illustrating the subject matter implemented at a sending phone rather than the switching network. Upon receiving a trigger as discussed above, transmitting phone 304 initiates communication with media gateway 308. Upon receipt of the signal, media gateway 308 sends a signal to application server 310 to retrieve from background tone storage 312 a desired background tone. Once application server 310 receives the background tone, a signal is sent to media gateway 308 to send the voice input to combiner 314 to combine the voice input received at transmitting phone 304 with the background tone received from background tone storage 312. It should be noted that the communication pathway between media gateway 308 and transmitting phone 304 is exemplary and non-limiting, as media gateway 308, application server 310, background tone storage 312, and/or combiner 314 may be integral components of transmitting phone 304 or a remote system in communication with transmitting phone 304.

As with FIG. 2, combiner 314 may be a separate process or integrated into media gateway 308 or other aspects of sending phone 304. FIG. 3 is illustrative and non-limiting and shows combiner 314 as a separate process only for the explanatory purposes. Once media gateway 308 receives the combined signal from combiner 314, media gateway 308 sends the combined voice input to transmitting phone 304 for transmission to switching network 302 and the eventual receipt of the combined voice signal at receiving phone 306.

Figure 4:
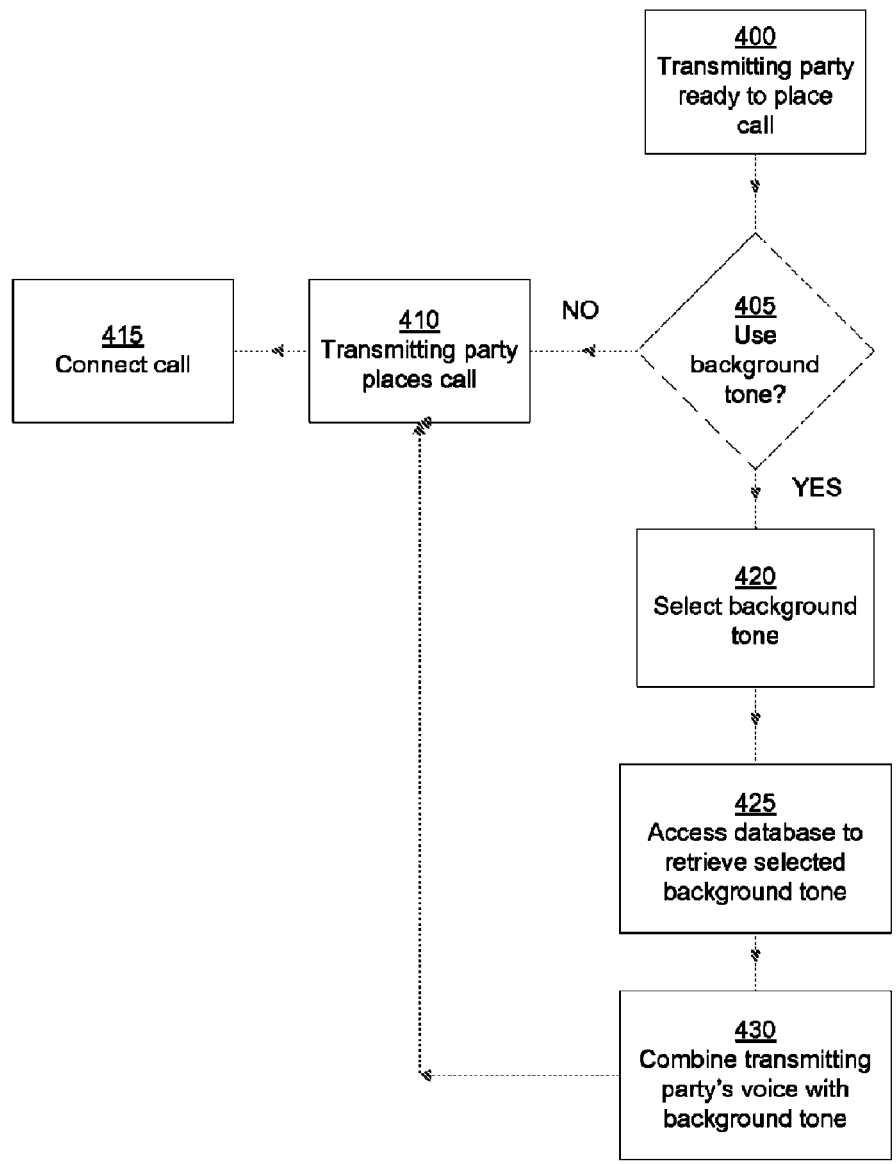
FIG. 4 is a flow diagram of a call origination using background tones.

FIG. 4 is an exemplary and non-limiting example of one aspect of call origination using background tones. At step 400, a user is ready to place a call, and at step 405, a determination is made whether or not to use background tones. This determination may be made in various ways. In one exemplary and non-limiting example, the user may decide to use background tones. In another exemplary and non-limiting example, the determination may be made based upon preset conditions such as the user profile, the time of the day, the location of the user, and user preferences.

If the determination is made that background tones are not to be used, the user places a call at step 410 and the call is connected at step 415. If at step 405 the determination is made that background tones are to be used, at step 420, the background tone is selected. As with the determination of whether or not to use background tones, the background tone selection may be performed in various ways. In one exemplary and non-limiting example, the user may select a particular background tone from a list of background tones. In another exemplary and non-limiting example, the background tone may be selected based upon a user profile, user preferences, the time of the call, and the location of the user.

Once the background tone is selected at step 420, the background tone is retrieved at step 425. The background tone may be located in various systems and be stored in various file formats. In one exemplary and non-limiting example, the background tone is a .wav file stored on a wireless network provider's systems. In another exemplary and non-limiting example, the background tone may be a .wav file stored on the user's cell phone. Once the background tone is retrieved, it is combined with the voice stream of the user at step 430 and the call is placed at step 410.

Figure 5:
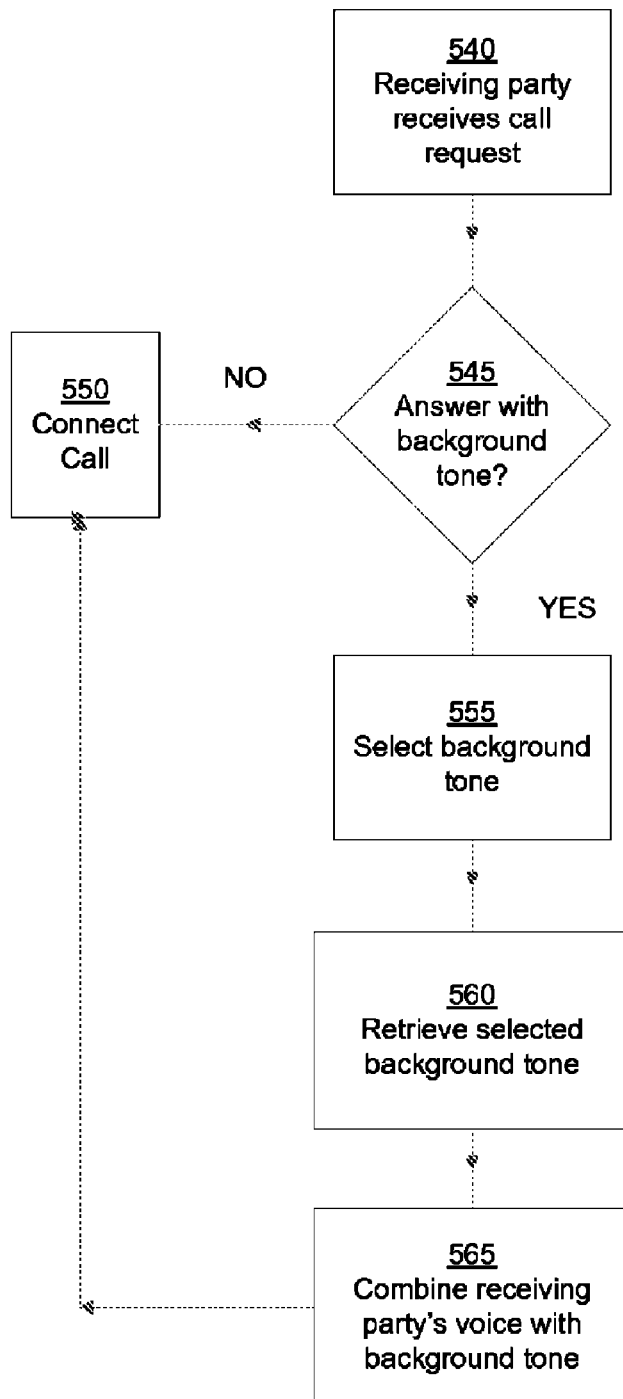
FIG. 5 is a flow diagram of answering a call using background tones.

In a similar manner to call origination using background tones, a recipient of a call may also use background tones. FIG. 5 is an exemplary and non-limiting example of one aspect of call receipt using background tones. At step 540, a receiving party may receive a call request. At step 545, a determination is made whether or not to use background tones at the receiving phone. As described in FIG. 4 above, the determination of the usage of a background tone may depend upon various inputs, including, but not limited to: the user, a user profile, the preferences of the user, the time of receiving the call, and the location of the recipient.

If background tones will be used, at step 555, the background tone is selected. As described in FIG. 4 above, the determination of what background tone to use may depend upon various inputs, including, but not limited to: the user, a user profile, the preferences of the user, the time of receiving the call, and the location of the recipient. Once the background tone has been selected, the background tone is retrieved at step 560 and combined with the voice of the recipient at step 565. After the voice and background tone have been combined, the call is connected at step 550.

Figure 6:
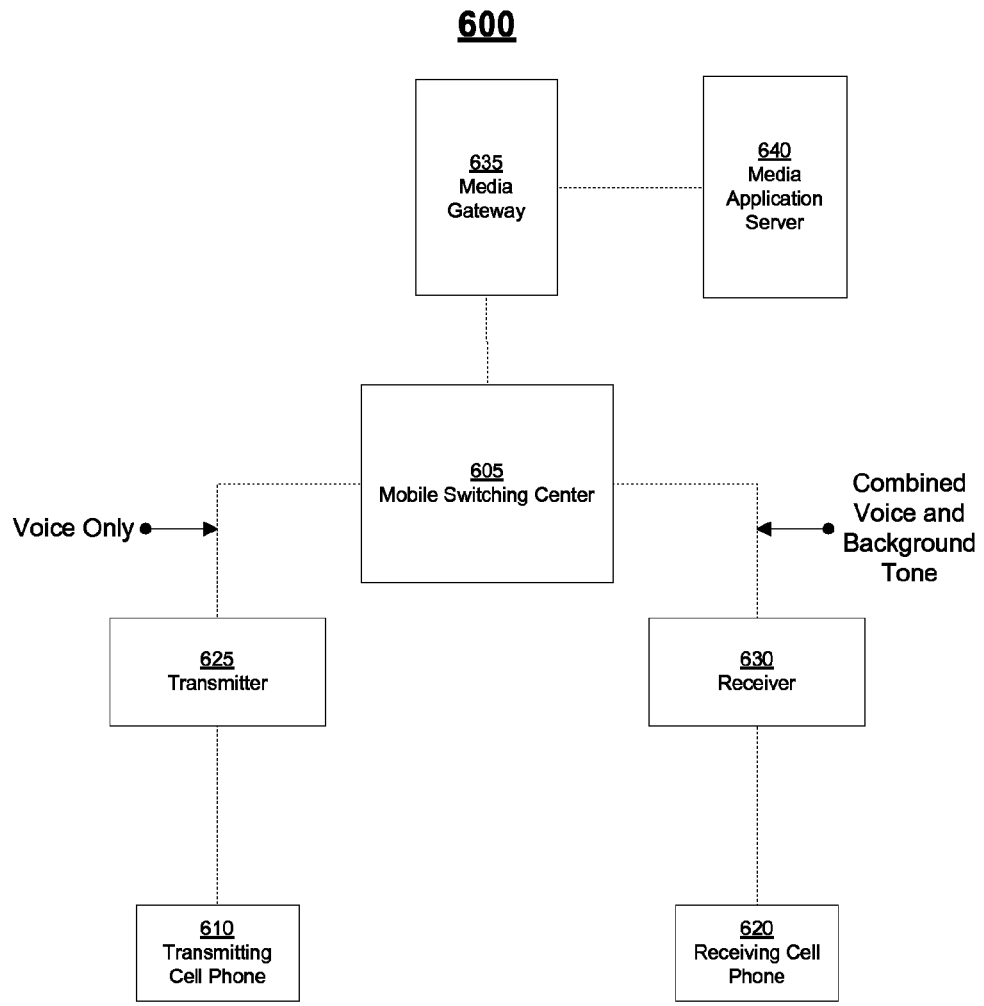
FIG. 6 is a diagram illustrating background tone use in a wireless network.

One exemplary and non-limiting aspect of the use of background tones in wireless network is shown in FIG. 6. As shown, wireless network 600 has mobile switching center (MSC) 605 in communication with media gateway 635 and media application server 640. There is an originating cell phone 610 and a receiving cell phone 620. Originating cell phone 610 is the cell phone in which a real background noise to be supplanted originates from. Receiving cell phone 620 is the cell phone that receives the background tone. The terms "originating" and "receiving" are not limited to any origination of the call, i.e. calling party, receiving party, sending party, etc.

Originating cell phone 610 transmits a voice signal via transmitter 625. Mobile switching center 605 receives the voice signal and determines if background tones are to be used. If background tones are to be used, MSC 605 sends a signal to media gateway 635 to retrieve a desired background tone from media application server 640. Once MSC 605 receives the background tone file, MSC 605 mixes the retrieved background tone with the voice input. In one exemplary and non-limiting example, MSC 605 may also send the voice input to media gateway 435. Media gateway 635 may then mix the retrieved background tone file with the voice input then send the combined signal to MSC 605. Once the combined signal is at MSC 605, MSC 605 then transmits the signal to receiver 630 of receiving cell phone 620. Preferably, the user of receiving cell phone 620 will perceive only the voice and the background tone and not the actual background noise. To improve performance, filters may be used in network 600 that at least partially filter the actual background noise from the voice input transmitted by transmitter 625.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the disclosed embodiments.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method comprising:
   accessing a plurality of pre-recorded background tones;
   triggering use of a first background tone of the plurality of pre-recorded background tones;
   combining the first background tone, sent via an application server, with first voice data, sent via a switching network and a media gateway, for transmission to a receiving telephone via the media gateway;
   triggering use of a second background tone of the plurality of pre-recorded background tones; and
   combining the second background tone with second voice data, wherein:
   the first voice data is from a first party on a call and the second voice data is from a second party on the call; and
   the call comprises a concurrent combination of the first background tone with the first voice data and the second background tone with the second voice data.

2. The method of claim 1, wherein multiple background tones of the plurality of pre-recorded background tones are combined with one of the first voice data or the second voice data at different times during the call.

3. The method of claim 1, wherein the trigger for the first background tone is initiated by the user of a transmitting telephone.

4. The method of claim 1, wherein the trigger for the first background tone is initiated by the user of a transmitting telephone depressing a key on the telephone.

5. The method of claim 3, wherein the trigger for the second background tone is initiated by a profile of the user of the transmitting telephone and a condition of the call, wherein the condition includes the current time or the current location of the user of the transmitting telephone.

6. The method of claim 1, wherein accessing the plurality of pre-recorded background tones is performed before the telephone call is connected.

7. The method of claim 1, wherein accessing the plurality of pre-recorded background tones is performed while the telephone call is in progress.

8. The method of claim 1, wherein the user of the transmitting telephone selects the first and second background tones.

9. The method of claim 1, wherein the second background tone is selected based upon a condition.

10. The method of claim 9, wherein the condition comprises the time, the identification of another party to the call, or the location of the transmitting party.

11. The method of claim 1, further comprising the step of filtering ambient noise.

12. The method of claim 1, wherein the second background tone comprises a false background, an entertainment file, an audio file, a security code, an advertisement, a music file, or a communication file.

13. A system comprising:
    a memory for storing a plurality of background tone files;
    a first triggering mechanism;
    a second triggering mechanism;
    a background tone selector responsive to the first triggering mechanism and the second triggering mechanism, wherein:
    the first triggering mechanism causes a selection of a first background tone and
    the second triggering mechanism causes a selection of a second background tone;
    a background tone output in communication with the background tone selection input and the memory, wherein:
    the background tone output outputs the first and second selected background tones;
    a combiner; and
    a switching network having first voice input data and second voice input data, wherein:
    the switching network sends the first and second voice input data to the combiner;
    the combiner combines the first voice input data, sent via the switching network and a media gateway, and the first selected background tone, sent via an application server, into a first stream and further combines the second voice input data, sent via the switching network and the media gateway, and the second selected background tone, sent via the application server, into a second stream;

the first stream is sent, via the media gateway, to a first caller on a call and the second stream is sent, via the media gateway to, a second caller on the call and the call comprises a concurrent combination of the first stream and the second stream.

14. The system of claim 13, wherein multiple selected background tones of the plurality of background tone files are combined with one of the first voice input data or the second voice input data at different times during the call.

15. The system of claim 13, wherein the telephone is a cellular telephone.

16. A system comprising:
a switching network, wherein the switching network receives an input to use a selected background tone, wherein the switching network further comprises a voice input;
a media gateway in communication with the switching network, wherein:
the switching network sends a signal to the media gateway to retrieve the selected background tone;
a media application server in communication with the media gateway, wherein the media application server further comprises a memory for storing a plurality of background tones, wherein:
the media application server sends the selected background tone to the media gateway; and
a combiner for combining a first background tone with first voice input data into a first stream and for combining a second background tone with second voice input data into a second stream, wherein:
the combiner comprises an input for receiving the first and second voice input data and an input for receiving the first and second background tones;
the first stream is sent, via the media gateway, to a first caller on a call and the second stream is sent, via the media gateway, to a second caller on the call; and
the call comprises a concurrent combination of the first stream and the second selected stream.

17. The system of claim 16, wherein multiple selected background tones are combined with one of the first voice input data or the second voice input data at different times during the call.

18. The system of claim 16, further comprising a filter to filter actual background noise from the voice input.

19. The system of claim 16, wherein the switching network is a mobile switching network.

20. A method comprising:
initiating the use of a background tone;
retrieving a list of a plurality of available background tones;
selecting from the list of the plurality of available background tones a first background tone and a second background tone;
retrieving the first selected background tone and the second selected background tone;
combining the first retrieved background tone, sent via an application server, with the voice input, sent via a switching network and a media gateway, associated with the user on a telephone call; and
combining the second retrieved background tone, sent via the application server, with the voice input, sent via the switching network and the media gateway, associated with a different party on the telephone call wherein:
the call comprises a concurrent combination of the first selected background tone with the voice input associated with the user and the second selected background tone with the voice input associated with the different party.

21. A system configured to communicate with a switching network, the system comprising:
a memory for storing profile information and a plurality of available background tones;
a keyboard for receiving keyboard inputs;
a first background tone triggering mechanism, wherein the first background tone triggering mechanism receives profile information and determines a first background tone based on the profile information;
a second background tone triggering mechanism, wherein the second background tone triggering mechanism receives keyboard input data and determines a second background tone based on the keyboard input data; and
a combiner for generating a combined stream comprising the first and second background tones, sent via an application server, with voice input data, sent via a switching network, wherein the second background tone is capable of authenticating a user in a secure transmission, wherein:
the combiner send the combined stream to the switching network via a media gateway; and
the call comprises a concurrent combination of the first background tone with the first voice input data and the second background tone with the second voice input data.

22. The system of claim 21, further comprising:
a display for displaying a list of available background tones.

* * * * *